United States Patent
Lambey et al.

(10) Patent No.: US 10,486,819 B2
(45) Date of Patent: Nov. 26, 2019

(54) METHOD AND DEVICE FOR MOUNTING AN ENGINE ON AN AIRCRAFT PYLON

(71) Applicant: SAFRAN AIRCRAFT ENGINES, Paris (FR)

(72) Inventors: Mario Lambey, Moissy-Cramayel (FR); Bruno Albert Beutin, Moissy-Cramayel (FR); Marc Patrick Tesniere, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 258 days.

(21) Appl. No.: 15/510,587

(22) PCT Filed: Sep. 16, 2015

(86) PCT No.: PCT/FR2015/052478
§ 371 (c)(1),
(2) Date: Mar. 10, 2017

(87) PCT Pub. No.: WO2016/042264
PCT Pub. Date: Mar. 24, 2016

(65) Prior Publication Data
US 2017/0259928 A1    Sep. 14, 2017

(30) Foreign Application Priority Data
Sep. 16, 2014   (FR) ..................... 14 58756

(51) Int. Cl.
*B64D 27/10*      (2006.01)
*B64D 27/26*      (2006.01)
*F02C 7/20*       (2006.01)

(52) U.S. Cl.
CPC ............. *B64D 27/10* (2013.01); *B64D 27/26* (2013.01); *F02C 7/20* (2013.01);
(Continued)

(58) Field of Classification Search
CPC .............. B64D 27/26; B64D 2027/266; B64D 2027/262; F02C 7/20; F05D 2230/60
See application file for complete search history.

(56) References Cited

U.S. PATENT DOCUMENTS

| 5,524,847 A | 6/1996 | Brodell et al. |
| 2012/0175462 A1 | 7/2012 | Journade et al. |

FOREIGN PATENT DOCUMENTS

| CN | 102498038 A | 6/2012 |
| EP | 0844174 A1 | 5/1998 |

(Continued)

OTHER PUBLICATIONS

International Search Report with English language translation, dated Nov. 26, 2015, PCT Application No. PCT/FR2015/052478.
(Continued)

*Primary Examiner* — Brian M O'Hara
*Assistant Examiner* — Keith L Dixon
(74) *Attorney, Agent, or Firm* — Womble Bond Dickinson (US) LLP

(57) ABSTRACT

The invention relates to a method for mounting an engine (1) on an aircraft strut (3) comprising engine suspension members (31) integral with the strut, the engine being integral with a suspension cradle (6) whereby it is suspended from the strut, the method comprising a step of hoisting the engine in a vertical direction as far as the strut then a step of approaching the strut by a movement of the engine in another direction, characterised in that an intermediate part (7) is fixed to the strut beforehand, by attaching it to said suspension members (31), said intermediate part (7) having an interface intended to cooperate with a complementary interface provided on the cradle (6), in such a way as to position the cradle relative to the intermediate part at the end of the approach movement to the strut.

(Continued)

The invention also relates to the system for implementing the method.

12 Claims, 2 Drawing Sheets

(52) U.S. Cl.
    CPC .. *B64D 2027/262* (2013.01); *B64D 2027/266* (2013.01); *F05D 2230/60* (2013.01); *F05D 2300/43* (2013.01)

(56) References Cited

FOREIGN PATENT DOCUMENTS

| | | |
|---|---|---|
| FR | 2920409 A1 | 3/2009 |
| FR | 2974065 A1 | 4/2011 |

OTHER PUBLICATIONS

Office Action received for Chinese Patent Application No. 201580049298.8, dated May 7, 2019, 10 pages (4 pages of English Translation and 6 pages of Office Action).

METHOD AND DEVICE FOR MOUNTING AN ENGINE ON AN AIRCRAFT PYLON

FIELD OF THE INVENTION

The present invention relates to the field of turboshaft engines, such as turbojet engines or turboprop engines, and concerns their mounting on an aircraft. It applies more particularly to the mounting of an engine on a strut integral with the aircraft.

PRIOR ART

As part of a development relating to an arrangement of the propulsion engines, it has been proposed that the engines be connected to the fuselage, in particular at the rear, by means of struts. The suspension of the engines advantageously comprises a cradle forming an interface with the strut and a structure connecting the cradle to the engine. It should be noted that the connection of the cradle to the strut comprises a pair of horizontal shafts integral with the strut which are fitted into lugs integral with the cradle, as seen in FIG. 1. This type of arrangement allows an easier installation of the equipment and also a balanced take-up of forces. Furthermore, it allows the engine to be installed on a strut that can have an inclination, in particular an upward inclination, relative to the horizontal.

In this case, however, there is a problem when the engine is installed on the aircraft—an operation also known as embodiment. Mounting an engine on an aircraft is already a delicate operation in itself because the suspension and the strut must be connected to one another with great precision. Precise positioning of an engine relative to the aircraft is essential, both from a mechanical point of view and from an aerodynamic and aircraft performance point of view. It is noted that the interface between the engine and the strut, the orientation of the engine, and the connecting structure require the suspension components to be pre-installed on the engine before the operation to mount the engine on the aircraft.

In this configuration, the operation to hoist the engine also requires two movements to be combined: firstly, a vertical translation of the engine to bring it to exactly the right height, and then a horizontal translation from the rear towards the front to allow the engine suspension members that are integral with the strut, that is, belonging to the strut, to interface correctly with the suspension components. However, as the lifting system consists of a lift bridge and slings, this operation carries the risk of damaging the suspension members on the strut, which would lead to additional immobilisation of the aircraft. The suspension members integral with the strut can comprise horizontal shafts and any flexible pads for damping vibrations.

The techniques for mounting an engine with hoisting via straps and movements in vertical and horizontal translation are known in themselves. An example of an operating procedure is described in patent application WO2012172208 filed in the name of the present applicant. The solution proposed in this document does not solve the problem of protecting certain members of the aircraft.

DESCRIPTION OF THE INVENTION

The present applicant has set itself the objective of overcoming this problem and of reducing the risks of damage related to the embodiment of engines.

This objective is achieved by implementing the method according to the invention.

Thus, the method for mounting an engine on an aircraft strut comprising engine suspension members integral with the strut, the engine being integral with a suspension cradle whereby it is suspended from the strut, the method comprising a step of hoisting the engine in a vertical direction as far as the strut then a step of approaching the strut by a movement of the engine in another direction, is characterised by the fact that an intermediate part is fixed to the strut beforehand, by attaching it to said suspension members, said intermediate part having an interface intended to cooperate with a complementary interface provided on the cradle in such a way as to lock the cradle in position relative to the intermediate part at the end of the approach movement to the strut.

The two interfaces are preferably arranged in such a way that the approach movement can be performed by translation perpendicular to the axis of the engine and the translation of the approach movement is preferably performed in a horizontal plane. In order to ensure an impactless approach movement, the cradle is guided and locked in position relative to the intermediate part by means of centring pins provided on one of the two interfaces, the pins cooperating with centring openings made in the other interface. The fixing method comprises a step of fixing the cradle to the intermediate part, once the cradle has been locked into position relative to the intermediate part.

The invention also relates to the system for implementing the method. It comprises a cradle and an intermediate part, the cradle being arranged to be fixed to the engine by a connecting structure and the intermediate part being arranged to be fixed to the strut independently of the cradle. This system preferably also comprises a means for fixing the cradle to the intermediate part. This latter fixing means comprises in particular bolts connecting the cradle to the intermediate part.

In order to facilitate the approach movement, the system comprises a means for locking the cradle in position on the intermediate part. According to another feature, the intermediate part of the system comprises means, such as lugs arranged to cooperate with the suspension members, such as shafts, integral with the strut.

The invention also relates to the whole of an aircraft and of at least one engine, the engine being fixed to a strut inclined upwards by means of the above system.

PRESENTATION OF THE FIGURES

The invention will be better understood and its other aims, details, features and advantages will become more clearly apparent on reading the detailed explanatory description that follows, of an embodiment of the invention given as a purely illustrative and non-restrictive example, with reference to the accompanying diagrammatic drawings.

DETAILED DESCRIPTION OF AN EMBODIMENT OF THE INVENTION

Figure 1:
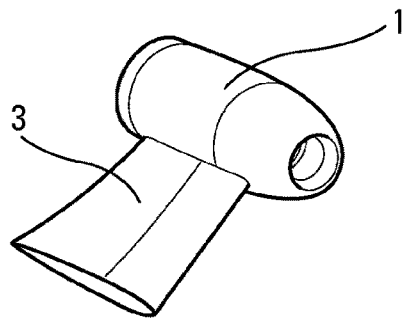
FIG. 1 is a representation of a whole formed by an engine and a strut for connection to the fuselage of an aircraft.

FIG. 1 shows an engine 1, for example an open rotor engine with its rotating nacelle, shown here without the propellers. The engine is mounted on a strut 3 that can be fixed to the fuselage of an aircraft, not shown here, forming a non-zero angle with a horizontal plane.

Figure 2:
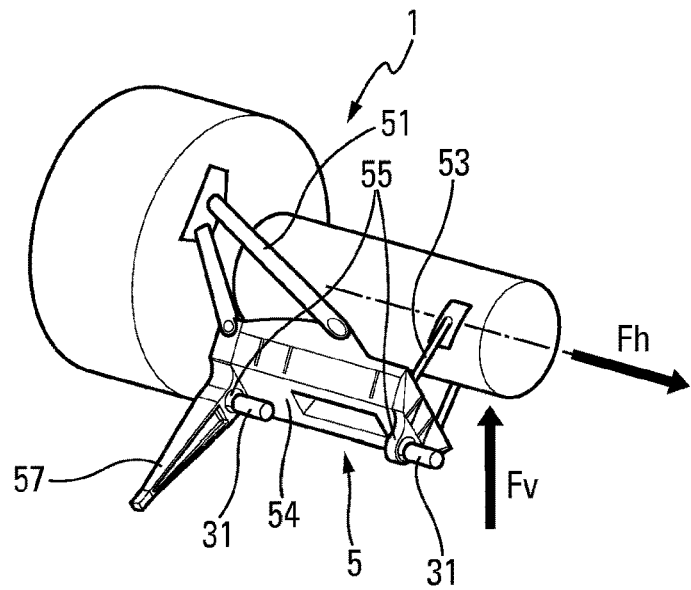
FIG. 2 shows a structure for fixing an engine to a strut, with some disadvantages that the invention aims to overcome.

FIG. 2 shows an example of a suspension cradle 5 developed by the applicant and enabling the engine 1 to be fixed to the strut 3. The engine, here an open rotor engine, is shown diagrammatically by a forward cylindrical portion representing the gas generator and a rear cylindrical portion with a larger diameter, representing the power turbine. The unducted propellers, typically two contra-rotating propellers, are not shown. The cradle 5 is extended on the engine side by a connecting structure with arms 51, 53 joining a plate 54, or equivalent, of the cradle to various attachment points on the engine situated on structural elements of the casing, such as the forward gas generator carcass and the rear casing that bears the propellers. The means for fixing to the strut are situated on the opposite side of the plate. Here, this likewise involves radial lugs 55 disposed in coaxial alignment and into which are slid coaxial shafts 31 constituting suspension members integral with the strut, which is not otherwise shown in FIG. 2. The shafts 31 form part of the strut and constitute means for attaching the engine to the strut.

Means that are not shown take up the axial forces between the engine and the strut. In addition, an arm 57 of the plate, perpendicular to the plate and in which one of the lugs 55 is formed, acts as a lever arm having as its axis of pivot the common axis of the lugs 55. It takes up the vertical forces transmitted by the engine to the strut, in particular the weight of the engine. This plate arm 57 is mounted on the strut in such a way as to prevent any rotation of the plate about the shafts 31. The strut can comprise a structure box onto which are fixed the shafts 31 and an interface adapted to accommodate the plate arm. The fairing of the strut 3 visible in FIG. 1 is put in place on the box after the cradle 5 has been connected to the box.

According to a mounting method initially envisaged and then abandoned by the applicant, the cradle is first of all fixed to the engine by means of the connecting structure, then the assembly is put in place on the strut. For this, the engine is presented, for example, on an engine trolley that is disposed substantially below the distal extremity of the strut, then the engine is attached to a hoist, such as a lift bridge, and is hoisted vertically to bring it to substantially the same height as the shafts 31, see the arrow Fv. The hoist comprises, for example, a bar having the form of a horizontal beam of which one extremity is connected by slings to the power turbine casing and the opposite extremity is connected by slings to the gas generator casing. In this way, the engine can be moved while maintaining its horizontal axis.

However, because the strut 3 forms a non-zero angle with a horizontal plane, merely hoisting the engine, that is, an upward translation only, is insufficient. This is because the movement of the cradle 5 is obstructed by the strut and in particular by the suspension members comprising the shafts 31 of the strut. Hoisting the engine must therefore bring the cradle 5 into a position at a distance from the shafts 31 and must be followed by a translation towards the strut in order to bring the engine closer to the strut. In particular here, the relative positions of the engine and the strut must allow a simple horizontal movement along the xx axis of the engine, see the arrow Fh. To this end, the shafts 31 must be placed so as to be coaxial with the axes of the lugs 55. During this translation, which constitutes a step of approaching the strut, the cradle 5 must be prevented from colliding with the shafts 31 which would risk being damaged, given the weight of the assembly moved, requiring work on the strut. Repair of the strut would lead to significant additional costs.

It is apparent that this method of mounting, initially envisaged, is not satisfactory; the risk of damaging the shafts 31 of the strut during movements is significant. In addition, the hoisting is followed by several movements in different directions, which complicates the implementation of the mounting and requires a system to move the hoist horizontally in at least two directions.

Figure 3:
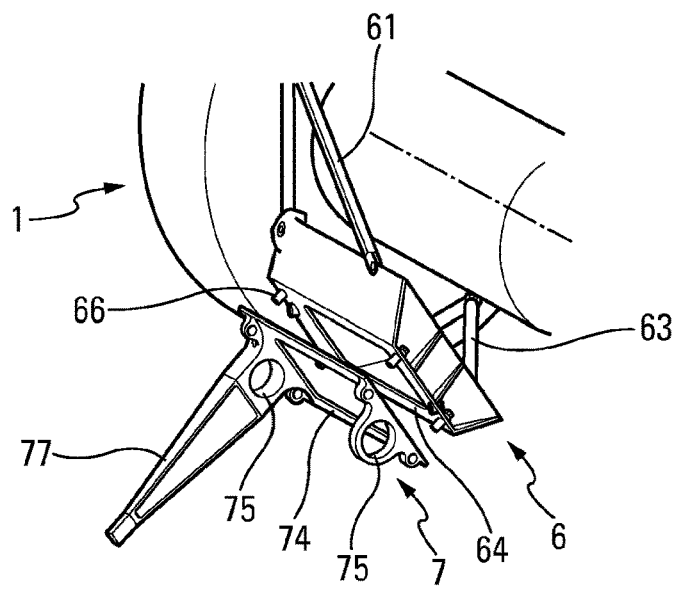
FIG. 3 shows, in exploded perspective, an arrangement for implementing the method according to the invention.
Figure 4:
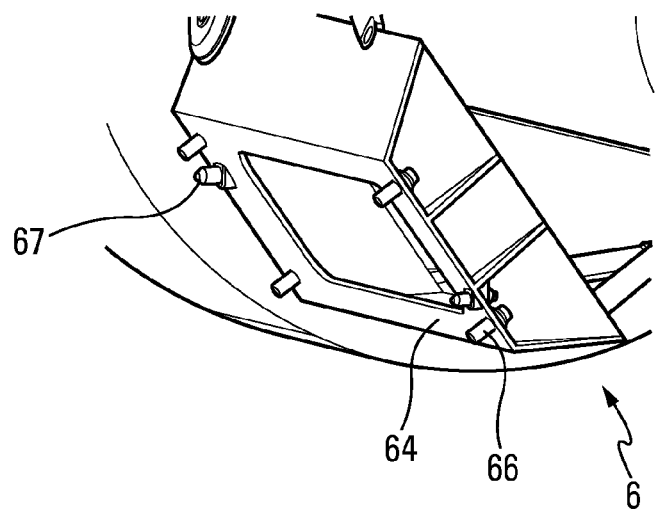
FIG. 4 shows the engine with the cradle of the arrangement only.
Figure 5:
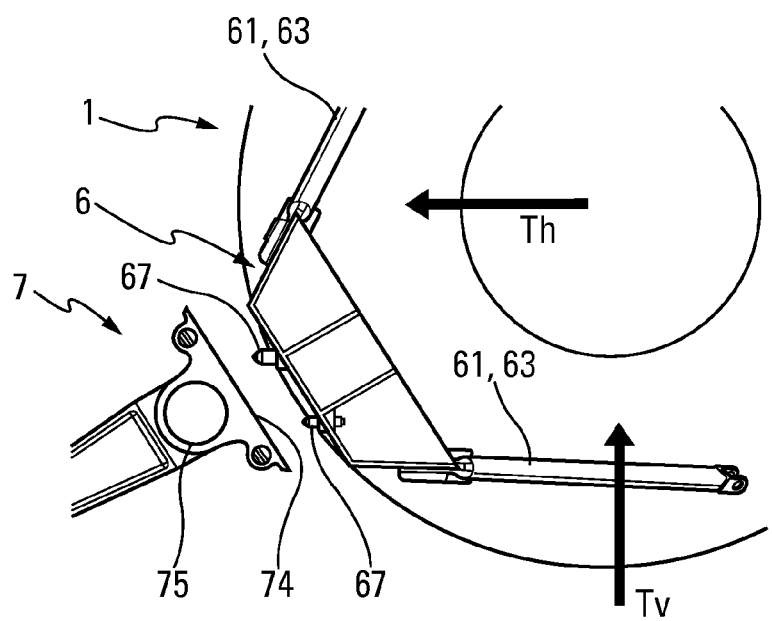
FIG. 5 shows a phase of mounting, according to the invention, the engine on the strut.

The applicant has therefore sought a solution to remedy these disadvantages. This solution is shown in FIGS. 3, 4 and 5.

The system of the invention comprises a cradle 6 and an intermediate part 7. The cradle 6 itself comprises a plate 64 or equivalent, extending from the engine side through a connecting structure 61, 63.

This connecting structure is formed, for example, by rear fasteners 61 on the rear casing that bears the propellers in the case of an open rotor engine and by forward fasteners 63 on the carcass of the gas generator. The realisation of the connecting structure does not form part of the invention and will not be described in detail. Any structure performing at least the function of fastener of the cradle to the engine is suitable.

The cradle 6 also comprises, on the side opposite the connecting structure, a means for fixing to the strut through the intermediate part 7. The plate 64 of the cradle is interfaced in such a way as to be capable of being brought onto the intermediate part 7 and fixed thereto by any appropriate removable means such as by screwing or bolting. FIG. 4 shows screws 66 in position to be screwed into corresponding openings made in the plate of the intermediate part 7.

The intermediate part 7 comprises a plate or equivalent 74 interfaced on the cradle side in such a way as to be capable of being brought onto and fixed to the cradle 6. For example, the plate 74 can have plane surfaces forming bearing surfaces for corresponding plane surfaces of the cradle plate 64. The intermediate part 7 is interfaced on the strut side in such a way as to be capable of being mounted on the engine suspension members, integral with the strut, and in particular on the shafts 31 of these suspension members. This latter interface comprises two lugs 75 arranged to receive the shafts 31. This connection can comprise flexible pads, which can for example be blocks of elastomer material or of braided metal, enabling the engine vibrations transmitted to the cabin of the aircraft to be reduced. A flexible pad can be incorporated between a strut shaft 31 and a lug 75 of the intermediate part 7. The intermediate part is, according to this embodiment, provided with an arm 77, the function of which is to take up the vertical forces transmitted by the engine to the strut. This arm 77 is fixed to the strut in such a way as to prevent any rotation of the intermediate part 7 about the shafts 31 integral with the strut.

Centring pins 67 are here provided on the cradle plate 64, and are able to cooperate with corresponding centring openings (not shown) provided on the plate 74 of the intermediate part 7 in such a way as to facilitate the mounting and positioning of the engine on the strut. As an alternative, the centring pins could be provided on the plate of the intermediate part, and the corresponding centring openings could be provided on the cradle plate.

The mounting operations are as follows.

The cradle 6 is first of all fixed to the engine while the engine is still on the ground. The intermediate part 7 is fixed to the strut 3 by introducing the shafts 31 of the latter into the lugs 75 of the intermediate part and the arm 77 into its housing on the strut. The position of the intermediate part 7 about the shafts 31 is thus determined: no rotation is possible.

The engine equipped with the cradle 6 is then disposed substantially in line with the free distal extremity of the strut. The engine is oriented about its axis so that the free interface of its plate 64 is parallel to the free interface of the plate 74 of the intermediate part. As can be seen in FIG. 5, the engine is hoisted by vertical translation, see the arrow Tv, up to the level of the intermediate part 7 already in place on the strut. The engine is then moved at right angles to its axis by horizontal translation, see the arrow Th, towards the intermediate part 7. The centring pins 67 extend preferably parallel to the horizontal direction of translation, so that each is substantially aligned with the axis of a corresponding centring opening provided on the plate 74 of the intermediate part 7. The centring pins and centring openings thus ensure the correct positioning of the cradle relative to the intermediate part during the horizontal translation Once the two plates 64 and 74 are in contact with one another and positioned in abutment relative to one another by virtue of the complementary nature of the interfaces of the cradle and the intermediate part, the two plates can be connected to one another by screws 66.

In other words, the intermediate part 7 has an interface capable of cooperating with a complementary interface provided on the cradle 6 in such a way as to lock the cradle in position relative to the intermediate part at the end of the step of approaching the strut. By virtue of this immobilisation, the plates 64 and 74 of the cradle and the intermediate part respectively can be connected to one another without any risk of one moving relative to the other during the connection operation, in particular without any risk of untimely sliding of one plate on the other while the fixing screws are put in place. It is sufficient during the connection operation to maintain the lifting apparatus in the end-of-approach position. Any small accidental movement of the lifting apparatus relative to the strut will not result in movement of the cradle 6 on the intermediate part 7, by virtue of the cooperation of the two interfaces.

In the embodiment described in the present application, the interface of the intermediate part 7 comprises the plate 74 and the openings (not shown) corresponding with the centring pins 67. The complementary interface of the cradle 6 comprises the plate 64 and the centring pins 67. It is understood that the two interfaces can be produced by other arrangements not including plates and/or centring pins, provided that these arrangements enable the cradle to be positioned relative to the intermediate part at the end of the step of approaching the strut. For example, a surface that has a projecting portion could be provided instead of the plate of the intermediate part 7, and a surface that has a hollow portion into which the projecting part is fitted could be provided instead of the cradle plate.

The solution of the invention thus enables an engine fitting operation that is simple to implement, minimising the risk of damaging the engine suspension members integral with the strut, by virtue, in particular, of the intermediate part whose fixing to the strut does not pose any particular problem and can be effected with optimum safety for the strut.

The invention claimed is:

1. A method for mounting an engine on an aircraft strut comprising engine suspension members integral with the strut, the engine being integral with a suspension cradle whereby it is suspended from the strut, the method comprising a step of hoisting the engine in a vertical direction as far as the strut then a step of approaching the strut by a movement of the engine in another direction, wherein an intermediate part is fixed to the strut beforehand, by attaching it to said suspension members, said intermediate part having an interface intended to cooperate with a complementary interface provided on the cradle, in such a way as to lock the cradle in position relative to the intermediate part at the end of the approach movement to the strut.

2. The method according to claim 1, wherein the engine extends along an axis and the two interfaces are arranged in such a way that the approach movement can be performed by translation perpendicular to the axis of the engine.

3. The method according to claim 2, wherein the translation of which is performed in a horizontal plane.

4. The method according to claim 1, wherein during the approach movement the cradle is guided and positioned relative to the intermediate part by means of centering pins provided on one of the two interfaces, said pins cooperating with centering, openings made in the other interface.

5. The method according to claim 1, comprising a step of fixing the cradle to the intermediate part once the cradle has been locked into position relative to the intermediate part.

6. A system for mounting an engine on an aircraft strut, comprising:
    a suspension cradle and an intermediate part, engine suspension members secured to the aircraft strut,
    wherein the suspension cradle is for joining to said engine by a connecting structure, and the intermediate part is for being fitted to said aircraft strut independently of the suspension cradle,
    wherein the intermediate part is fixed to said aircraft strut by attaching said intermediate part to said engine suspension members, and
    wherein said intermediate part has an interface to cooperate with a complementary interface provided on the suspension cradle, and configured to lock the suspension cradle in position relative to the intermediate part at the end of the approach movement of the strut.

7. The system according to claim 6, comprising a means for fixing the suspension cradle to the intermediate part.

8. The system according to claim 7, wherein the fixing means comprises bolts or screws connecting the suspension cradle to the intermediate part.

9. The system according to claim 6, comprising a means for locking the suspension cradle in position on the intermediate part.

10. The system according to claim 6, wherein the intermediate part comprises lugs arranged to cooperate with said engine suspension members.

11. The system according to claim 10, wherein the engine suspension members comprise horizontal shafts fixed to the aircraft strut.

12. Assembly of an aircraft and at least one engine, the engine being fixed to an aircraft strut through a system according to claim 6.

* * * * *